(12) United States Patent
Gu et al.

(10) Patent No.: US 11,415,311 B2
(45) Date of Patent: Aug. 16, 2022

(54) PHOTOGRAPHY LAMP

(71) Applicant: APUTURE IMAGING INDUSTRIES CO., LTD., Guangdong (CN)

(72) Inventors: Haijun Gu, Guangdong (CN); Aimin Zhang, Guangdong (CN); Xiangjun Zhou, Guangdong (CN); Yi Xie, Guangdong (CN)

(73) Assignee: APUTURE IMAGING INDUSTRIES CO., LTD., Guangdong (CN)

( * ) Notice: Subject to any disclaimer, the term of this patent is extended or adjusted under 35 U.S.C. 154(b) by 0 days.

(21) Appl. No.: 17/128,250

(22) Filed: Dec. 21, 2020

(65) Prior Publication Data
US 2021/0262653 A1 Aug. 26, 2021

(30) Foreign Application Priority Data
Feb. 20, 2020 (CN) .......................... 202020192720.3

(51) Int. Cl.
*F21V 33/00* (2006.01)
*F21V 29/67* (2015.01)
(Continued)

(52) U.S. Cl.
CPC ........ *F21V 33/0052* (2013.01); *F21V 29/673* (2015.01); *F21V 29/76* (2015.01); *F21Y 2115/10* (2016.08); *H04N 5/2256* (2013.01)

(58) Field of Classification Search
CPC .... F21V 33/0052; F21V 29/673; F21V 29/76; F21Y 2115/10; H04N 5/2256
See application file for complete search history.

(56) References Cited

U.S. PATENT DOCUMENTS

| | | | |
|---|---|---|---|
| 2010/0220488 A1* | 9/2010 | Zheng | F21V 29/677 362/373 |
| 2012/0063116 A1* | 3/2012 | Baxter | F21V 29/673 362/6 |

(Continued)

FOREIGN PATENT DOCUMENTS

| | | |
|---|---|---|
| CN | 201628171 U | 11/2010 |
| CN | 201666512 U | 12/2010 |

(Continued)

OTHER PUBLICATIONS

Communication dated Jul. 21, 2021 by GPTO, for Aputure Imaging Industries Co., Ltd., German application No. 102020215758.8, filed on Dec. 11, 2020.

*Primary Examiner* — Andrew J Coughlin
*Assistant Examiner* — Jessica M Apenteng
(74) *Attorney, Agent, or Firm* — Mark M. Friedman

(57) ABSTRACT

A photography lamp includes a housing assembly, a heat dissipation assembly, and a light source assembly. The housing assembly includes a lamp barrel and a rear cover, a main air inlet is disposed on the rear cover, and an air outlet grille is disposed on a side wall of the lamp barrel close to the light outlet end. The heat dissipation assembly includes a fan, the air outlet side of the fan is spaced from the light source assembly, a spacing is arranged between the air outlet side of the fan and the light source assembly, and the spacing is always facing the air outlet grille in the direction of the central axis of the lamp barrel. The photography lamp can improve heat dissipation efficiency of photographic lighting fixtures.

10 Claims, 12 Drawing Sheets

(51) Int. Cl.
    *F21V 29/76*     (2015.01)
    *H04N 5/225*     (2006.01)
    *F21Y 115/10*     (2016.01)

(56) References Cited

U.S. PATENT DOCUMENTS

| | | | |
|---|---|---|---|
| 2012/0206927 A1* | 8/2012 | Miyahara | F21V 29/773 362/382 |
| 2012/0275163 A1* | 11/2012 | Chen | F21V 29/83 362/294 |
| 2015/0159851 A1* | 6/2015 | Li | F21V 23/009 362/294 |

FOREIGN PATENT DOCUMENTS

| | | |
|---|---|---|
| CN | 203628379 U | 6/2014 |
| CN | 104295958 A | 1/2015 |
| CN | 103123105 B | 1/2016 |

* cited by examiner

PHOTOGRAPHY LAMP

PRIORITY CLAIM

This application claims priority to Chinese Patent Application Number 202020192720.3 filed Feb. 20, 2020, the disclosures of which are incorporated in their entirety by reference herein.

FIELD OF INVENTION

This present disclosure generally relates to the technical field of photographic lighting equipment, and particularly relates to a photography lamp.

BACKGROUND OF INVENTION

LED (Light Emitting Diode) lamps have been widely used in photographic lighting, and the development of LED lighting technology has developed a new high tide due to the continuous rise of energy prices and the nationality injunction of incandescent lamps selling. Emerging LED lamps have many advantages such as low energy consumption, good light efficiency, long life, and no pollution. They are far superior to traditional lighting products at all levels, thereby gradually become the best choice for new and green lighting technologies. However, photography lamps used in photography lighting require high brightness. The increase in the number of LED chips used in COB chips with the popularity of COB chips causes generate relatively high heat temperature, which will affect the reliability and service life of the product. Therefore, the design of heat dissipation structures is particularly necessary for LED lights used in small, high-brightness photographic lighting fixtures.

SUMMARY OF INVENTION

The present disclosure provides a photography lamp, which aims to improve the low heat dissipation efficiency of existing photographic lighting fixtures.

To achieve the above purpose, the present disclosure provides a photography lamp comprising: a housing assembly including a lamp barrel with a light outlet end and an assembly rear end and a rear cover being disposed on the assembly rear end, wherein a main air inlet is disposed on the rear cover, an air outlet grille is disposed on a side wall of the lamp barrel close to the light outlet end; a heat dissipation assembly that movably disposed within the lamp barrel, the heat dissipation assembly includes a fan; and a light source assembly that movably disposed within the lamp barrel; the fan and the light source assembly are connected and moved synchronously with each other, the fan is located between the rear cover and the light source assembly, an air outlet side of the fan faces the light source assembly, a spacing is arranged between the air outlet side of the fan and the light source assembly, and the space is always facing the air outlet grille in the direction of the central axis of the lamp barrel.

The photography lamp the present disclosure provided has the following advantages. During the working process of the photography lamp, the light source assembly generates heat. At this time, the fan blows in the air, the flowing wind enters from the main air inlet and blows to the light source assembly through the fan. Then the wind blows out from the air outlet grille to take the heat of the light source assembly away to achieve the purpose of heat dissipation and cooling. In the photography lamp, the fan always provides air and heat dissipation during the working process of the light source assembly, thereby ensuring that the working environment temperature in the photography lamp be maintained at a low level, and the ensuring then normal working performance of the light source assembly to effectively extend the service life of the light source assembly.

DESCRIPTION OF DRAWINGS

In order to explain the technical solutions in the embodiments of the present disclosure more clearly, the following will briefly introduce the drawings that need to be used in the description of the embodiments or the prior art. Obviously, the drawings in the following description are only for some embodiments, those of ordinary skill in the art can obtain other drawings based on these drawings without creative effort.

Figure 1:
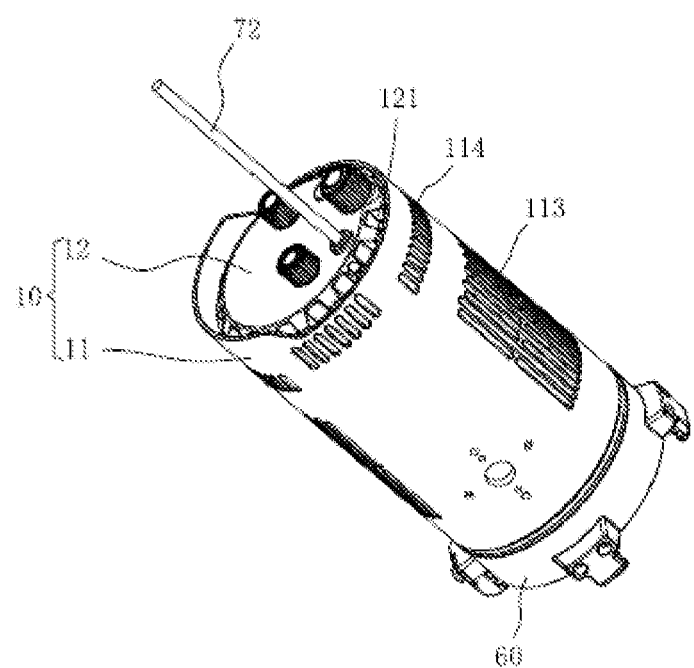
FIG. 1 is a three-dimensional schematic diagram of the assembly of a photography lamp according to one embodiment of the present disclosure.

In the drawings, references are labeled as follows:
10 Housing assembly; 11 Lamp barrel; 101 Guide slide rail; 111 Light outlet end; 112 Assembly rear end; 113 Air outlet grille; 114 Auxiliary air inlet grille; 12 Rear cover; 121 Main air inlet; 20 Heat dissipation assembly; 21 Fan; 22 Radiator; 23 Heat pipe; 30 Light source assembly; 31 Mounting frame; 311 Second avoidance gap; 312 Second supporting bar; 3121 Second contacting ribs; 312 Third angle R; 3123 Fourth angle R; 313 Heat pipe end receiving groove; 32 light source lens; 33 LED chip; 34 Heat-conducting pressing sheet; 35 Light shield; 40 Driving assembly; 41 Screw rod; 42 Adapter frame; 421 First avoidance gap; 422 First supporting bar; 4221 First contacting rib; 42211 First R angle; 42212 Second R angle; 43 Internal thread sleeve; 50 Light outlet lens; 60 Front cover; 71 Circuit board; 72 Cable.

DETAILED DESCRIPTION OF PREFERRED EMBODIMENTS

The following content combines with the drawings and the embodiment for describing the present disclosure in detail. The same or similar reference numerals indicate the same or similar elements or elements with the same or similar functions It is obvious that the following embodiments are only some embodiments of the present invention, but should not be understood as a limitation to the present disclosure.

In the description of the present disclosure, it is to be understood that the orientation or positional relationship indicated by the terms such as "length", "width", "up", "down", "front", "behind", "left", "right", "vertical", "horizontal", "top", "bottom", "inner", "outer" etc. is based on the orientation or positional relationship shown in the drawings, and is only for convenience of description of the present application and simplified description, which is not indicating or implying that the device or component referred to must have a particular orientation, constructed and operated in a particular orientation, thus it is not to be construed as limiting the present disclosure.

Moreover, the terms "first" and "second" are used for descriptive purposes only and are not to be construed as indicating or implying a relative importance or implicitly indicating the number of technical features indicated. Thus, features defining "first" or "second" may include one or more of the described features either explicitly or implicitly. In the description of the present application, the meaning of "a plurality" is two or more unless specifically and specifically defined otherwise.

In the present disclosure, unless otherwise clearly specified and limited, the terms "mounting", "linked", "connected", "fixed" and other terms should be understood in a broad sense, for example, it can be a fixed connection or a detachable connection, connected or integrated; it can be a mechanical connection or an electrical connection; it can be directly connected or indirectly connected through an intermediate medium, and it can be the internal communication between two elements or the interaction between two elements. For those of ordinary skill in the art, the specific meaning of the above-mentioned terms in the present disclosure can be understood according to specific circumstances.

As shown in FIG. 1-FIG. 12, an embodiment of the present disclosure provides a photography lamp comprising: a housing assembly 10, a heat dissipation assembly 20 and a light source assembly 30. Wherein, the housing assembly 10 includes a lamp barrel 11 and a rear cover 12, and the heat dissipation assembly 20 includes a fan 21. When assembling the photography lamp, the lamp barrel 11 has a light outlet end 111 and an assembly rear end 112, the rear cover 12 is disposed on the assembly rear end 112, a main air inlet 121 is disposed on the rear cover 12, an air outlet grille 113 is disposed on a side wall of the lamp barrel close to the light outlet end 111, the heat dissipation assembly 20 is movably disposed within the lamp barrel, and the light source assembly 30 is movably disposed within the lamp barrel. The fan 21 and the light source assembly 30 are connected and moved synchronously with each other. The fan 21 is located between the rear cover 12 and the light source assembly 30. An air outlet side of the fan 21 faces the light source assembly 30, a spacing is arranged between the air outlet side of the fan 21 and the light source assembly 30, and the spacing between the air outlet side of the fan 21 and the light source assembly 30 is always facing the air outlet grille 31.

In some embodiments, an auxiliary air inlet grille 114 is disposed on a side wall of the lamp barrel 11 close to the assembly rear end 112, and the auxiliary air inlet grille 114 is located between the rear cover 12 and an air inlet side of the fan 21.

In some embodiments, the heat dissipation assembly 20 comprises a radiator 22 mounted between the fan and the light source assembly 30, wherein a plurality of fins are disposed with spacings therebetween to form the radiator 22, wherein spacings between the plurality of fins are always facing the air outlet grille 113 in the direction of the central axis of the lamp barrel 11; and a heat pipe 23 disposed between the radiator 22 and the light source assembly 30, the heat pipe 23 is in contact with the bottom of the radiator 22 and the top of the light source assembly 30.

In some embodiments, the light source assembly 30 comprises mounting frame 31; a light source lens 32 mounted on the mounting frame 31; LED chips 33 33 mounted on the mounting frame 31, and the LED chips 33 emits light out through the light source lens 32; and a heat-conducting pressing sheet 34 connected to the mounting frame 31, wherein the LED chips 33 is pressed on the mounting frame 31 by the heat-conducting pressing sheet 34, as well as the heat pipe is in contact with the heat-conducting pressing sheet 34.

In some embodiments, the photography lamp further comprises: a driving assembly 40 the first end of the which is disposed on the rear cover 12 and the second end is connected with the heat dissipation assembly 20, wherein the driving assembly 40 is used to drive the heat dissipation assembly 20 and the light source assembly 30 to move in the lamp barrel 11; and a light outlet lens 50 mounted on the light outlet end.

In some embodiments, the light source assembly 30 further comprises a light shield 35; wherein one end of the light shield 35 is connected to the mounting frame 31, the other end of the light shield 35 extends towards the light outlet side of the light source lens 32 and the light shield 35 is used for shielding the air outlet grille 113 that corresponding to the light outlet side of the light source lens 32 and the light outlet lens 50 when the light source assembly 30 moves.

In some embodiments, the driving assembly 40 comprises: a screw rod 41 the first end of which is connected to the rear cover 12; an adapter frame 42 connected to the heat dissipation assembly 20; and an internal thread sleeve 43 mounted and fixed on the adapter frame 42, and the second end of the screw rod 41 is threadedly connected to the internal thread sleeve 43.

In some embodiments, the fan 21 and the radiator 22 are both fixedly connected to the adapter frame 42, and an interval for noise reduction is formed by the fan 21 passing through the adapter frame 42 and the radiator 22.

In some embodiments, at least one guide slide rail 101 extending along the central axis of the lamp barrel 11 is disposed on the inner wall of the lamp barrel 11; wherein a first avoidance gap that adapted to the guide slide rail 101 is disposed on the adapter frame 42, and the adapter frame 42 is connected with a first supporting bar 422 corresponding to the first avoidance gap, and one end of the first supporting bar 422 is fixedly connected to the adapter frame 42, and the other end of the first supporting bar 422 is free end, and the shaft of the first supporting bar 422 and the adapter frame 42 are spaced apart; wherein a second avoidance gap 311 adapted to the guide slide rail 101 is disposed on the mounting frame 31, and the mounting frame 31 is connected with a second supporting bar 312 corresponding to the second avoidance gap 311, and one end of the second supporting bar 312 is fixedly connected to the adapter frame 42, and the other end of the second supporting bar 312 is free end, and the shaft of the first supporting bar 422 and the mounting frame 31 are spaced apart.

In some embodiments, there are four guide slide rail 101 evenly distributed along the circumference of the inner side wall of the lamp barrel 11, and the cross section of each guide slide rail 101 is circular, wherein the first supporting bar 422 is formed with two first contacting ribs 4221 at intervals, the second supporting bar 312 is formed with a second contacting rib 3121, and top surfaces of the first contacting ribs 4221 and the second contacting rib 3121 are all arc-shaped surfaces, and the arc-shaped top surfaces of the first contacting ribs 4221 and the second contacting rib 3121 are in sliding contact with the guide slide rail 101.

The photography lamp provided by the present disclosure is used for photographic lighting. During the working process of the photography lamp, the light source assembly 30 generates heat. At this time, the fan 21 blows in the air, the flowing wind enters from the main air inlet 121 and blows to the light source assembly 30 through the fan 21. Then the wind blows out from the air outlet grille 113 to take the heat of the light source assembly away to achieve the purpose of heat dissipation and cooling. In the photography lamp, the fan 21 always provides air and heat dissipation during the working process of the light source assembly 30, thereby ensuring that the working environment temperature in the photography lamp be maintained at a low level, and then ensuring the normal working performance of the light source assembly 30 to effectively extend the service life of the light source assembly.

Preferably, in order to improve the efficiency of air intake and the efficiency of air supply and heat dissipation, an auxiliary air inlet grille 114 is disposed on a side wall of the lamp barrel close to the assembly rear end 112, and the auxiliary air inlet grille 114 is located between the rear cover 12 and an air inlet side of the fan 21. The auxiliary air inlet grille 114 is added to increase the air inlet volume, thereby improving the efficiency of air supply and heat dissipation.

Figure 2:
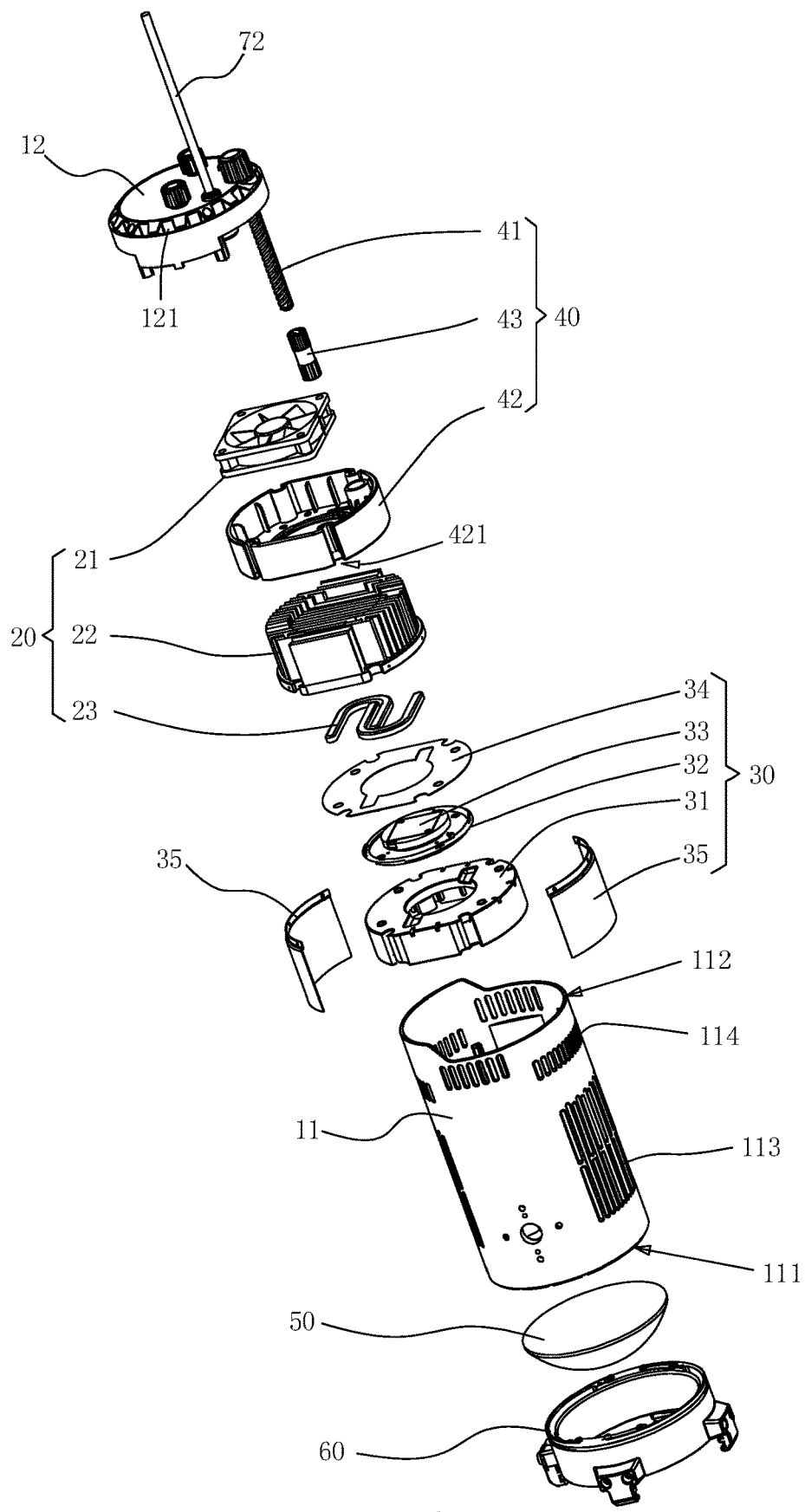
FIG. 2 is an exploded view from a first perspective of a photography lamp according to one embodiment of the present disclosure.
Figure 3:
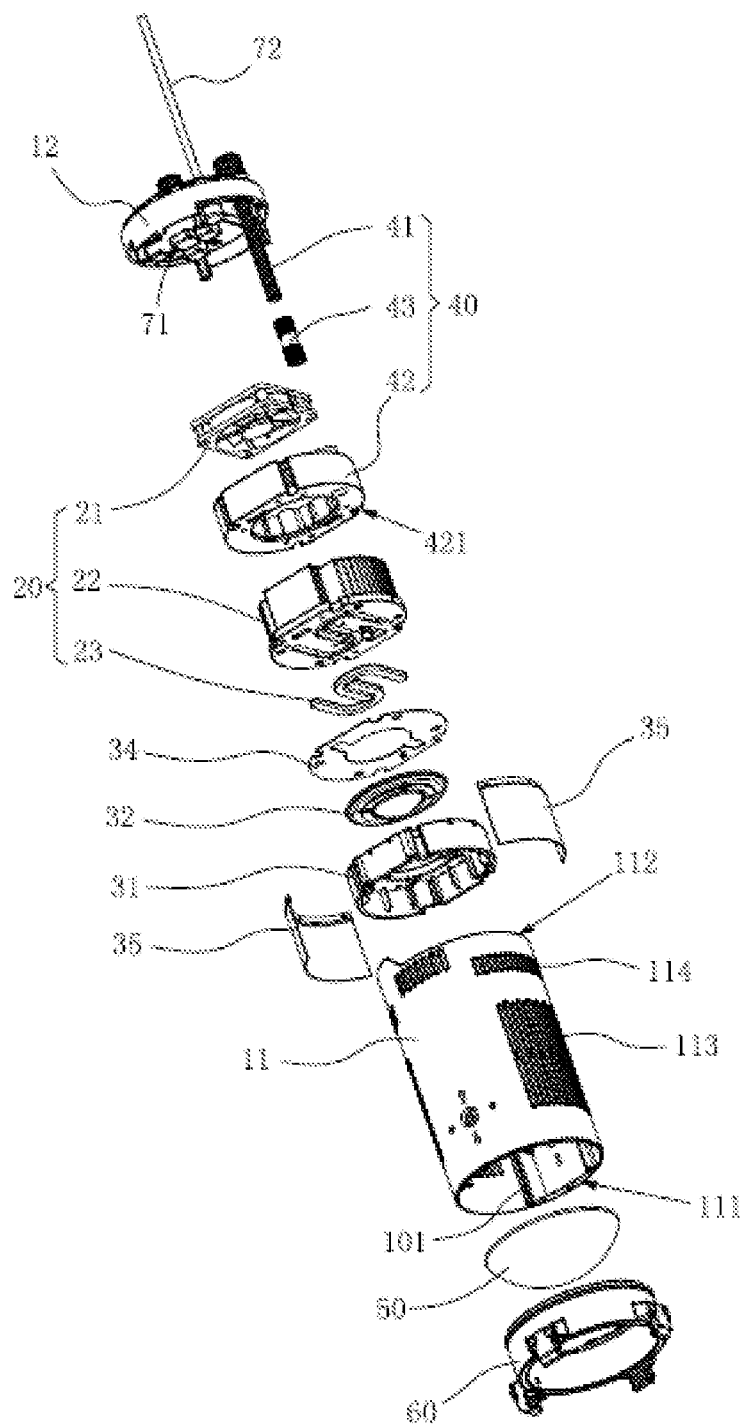
FIG. 3 is an exploded view from a second perspective of a photography lamp according to one embodiment of the present disclosure.
Figure 4:
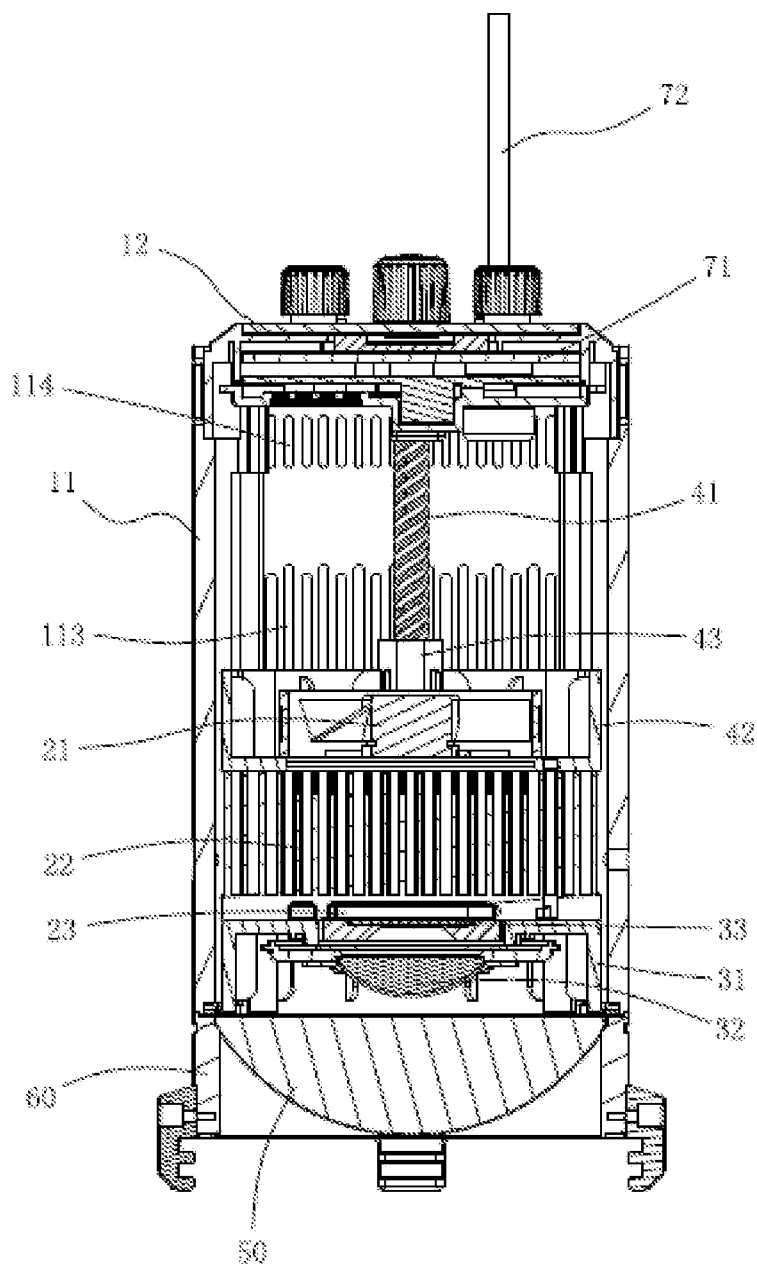
FIG. 4 is a cross-sectional view of the photography lamp according to one embodiment of the present disclosure.

As shown in FIG. 2 to FIG. 4, in this embodiment, the heat dissipation assembly 20 further includes a radiator 22 mounted between the fan 21 and the light source assembly 30. Therefore, the heat generated during the working process of the light source assembly 30 is first absorbed by the radiator 22, and the heat of the light source assembly 30 is removed out at the first time, and then the fan 21 blows air to the radiator 22 to dissipate and cool the radiator 22. Specifically, a plurality of fins disposed with spacings therebetween to form the radiator 22, and spacings between the plurality of fins are always facing the air outlet grille 113. That is, the wind passing through the fins can always be sent out from the outlet grille 113 to dissipate the heat to the external environment.

To improve the thermal conductivity of heat transfer between the heat sink 22 and the light source assembly 30, the heat dissipation assembly 20 further includes a heat pipe 23. The heat pipe is disposed between the radiator 22 and the light source assembly 30, and the heat pipe is in contact with the bottom of the radiator 22 and the top of the light source assembly 30.

As shown in FIG. 2 to FIG. 4, the photography lamp provided by the present disclosure further includes a driving assembly 40, wherein the first end of the driving assembly 40 is disposed on the rear cover 12, the second end of the driving assembly 40 is connected with the heat dissipation assembly 20. During the working process of the photography lamp, the driving assembly 40 is used to drive the heat dissipation assembly 20 and the light source assembly 30 to move in the lamp barrel 11. Specifically, the driving assembly includes a screw rod 41, an adapter frame 42 and an internal thread sleeve 43. The first end of the screw rod 41 is connected to the rear cover 12, and the adapter frame 42 is fixedly connected to the fan 21 of the heat dissipation assembly 20. Actually, the fan 21 is fixedly connected to the adapter frame 42, and then fixedly connected to the radiator 22 through the adapter frame 42. At this time, the air outlet side of the fan 21 is spaced apart from the ends away from the heat pipe 23 of the plurality of fins because of the load of the adapter frame 42. And this can effectively reduce noise during the process of air supply process of the fan 21.

The internal thread sleeve 43 is mounted and fixed on the adapter frame 42, and the second end of the screw rod 41 is threadedly connected to the internal thread sleeve 43. In addition, the photography lamp is equipped with a light outlet lens 50 on the light outlet end 111 of the lamp barrel 11, and the front cover 60 is used to achieve an aperture effect during photographic lighting. The first end of the screw rod 41 is equipped with an operating knob on the rear cover 12, and the screw rod 41 is driven to rotate by manually turning the operating knob. The screw rod 41 is coated with damping oil, and then the internal thread sleeve 43 is driven to make linear movement along the central axis of the screw rod 41 to drive the heat dissipation assembly 20 and the light source assembly 30 to move synchronously with respect to the light outlet lens 50 to adjust the lighting focus. When the heat dissipation assembly 20 and the light source assembly 30 move synchronously in the direction of the central axis of the lamp barrel 11, the spacing between the air outlet side of the fan 21 and the light source assembly 30 is always facing the air outlet grille 113. Stable and reliable straight linear movement is achieved by this structural scheme for realizing slippage.

As shown is FIG. 2 and FIG. 3, the light source assembly 30 of the photography lamp in the embodiment includes a mounting frame 31, a light source lens 32, LED chips 33, a heat-conducting pressing sheet 34 and a light shield 35. The light source lens 32 is mounted on the mounting frame 31, the light source lens 32 is opposite to the light outlet lens 50, and the LED chips 33 are mounted on the mounting frame 31. The light emitted by the LED chip 33 is emitted through the light source lens 32 and irradiated to the light output lens 50. When the light source assembly 30 moves, the relative distance between the light source lens 32 and the light outlet lens 50 is changed to achieve focus adjustment. The heat-conducting pressing sheet 34 is connected to the mounting frame 31 to presses the LED chips 33 on the mounting frame 31, and the heat pipe 23 is contact with the mounting frame 31.

The heat generated by the light emission of the LED chips 33 is first transferred to the heat-conducting pressing sheet 34 and then to the heat pipe 23. Then the heat is transferred to the fins through the heat pipe 23 and taken away the fan 21 to achieve heat dissipation and cooling.

One end of the light shield 35 is connected to the mounting frame 31, and the other end of the light shield 35 extends toward the light exit side of the light source lens 32. When the light source assembly 30 moves, the light shield 35 is used for shielding the air outlet grille 113 that corresponding to the light outlet side of the light source lens 32 and the light outlet lens 50. In this way, during the process of adjusting the illumination focal length, the light emitted by the light source lens 32 is blocked by the light shield 35 and will not leak from the exit grating 113, which ensures the utilization efficiency of the illumination light.

In this embodiment, the circuit board 71 is mounted on the rear cover 12. As shown in FIG. 3, a cable 72 connected to the circuit board 71 passes through the rear cover 12 to connect to an external power source. The fan 21 and the LED chips 33 are electrically connected to the circuit board 71 to obtain the power requirement for operation.

As shown in FIG. 5 to FIG. 9, at least one guide slide rail 101 extending along the central axis of the lamp barrel 11 is disposed on the inner wall of the lamp barrel 11. In one embodiment, there are four guide slide rails 101 evenly distributed along the circumference of the inner side wall of the lamp barrel. Accordingly, four first avoidance gaps 421 that adapted to the guide slide rails 101 are disposed on the adapter frame 42, and the adapter frame 42 is connected with a first supporting bar 422 corresponding to the first avoidance gaps 421. Specifically, one end of the first supporting bar 422 is fixedly connected to the adapter frame 42, the other end of the first supporting bar 422 is free end, and the shaft of the first supporting bar 42 and the adapter frame 42 are spaced apart. That is, the first support bar 422 is formed as an elastic structure relative to the adapter frame 42. During the assembly process, when the guide slide rail 101 is inserted into the first avoidance gap 421, the first supporting bar 422 and the guide slide rail 101 are effectively contacted with each other, and elastic force is generated to make the lamp barrel 11 return to the normal position when its position shifts away.

In the present disclosure, the adapter frame 42 and the first supporting bar 422 are integrally formed and are made of engineering synthetic plastics with good wear resistance, toughness, and strength with a long service life.

Figure 5:
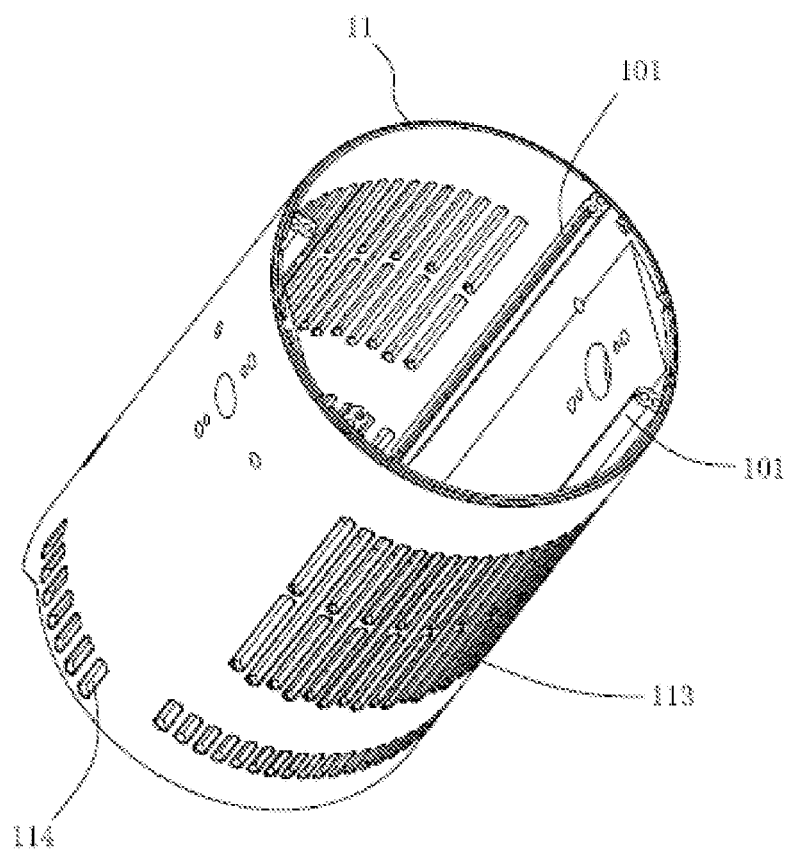
FIG. 5 is a schematic diagram showing the structure of a lamp barrel of a photography lamp according to one embodiment of the present disclosure.
Figure 6:
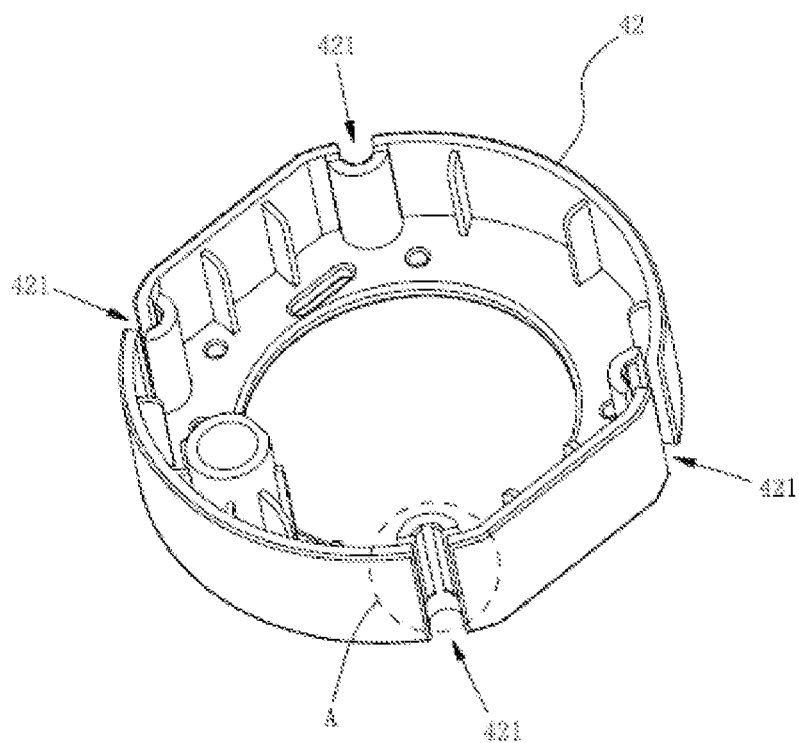
FIG. 6 is a schematic diagram showing a first perspective of an adapter frame of a photography lamp according to one embodiment the present disclosure.
Figure 7:
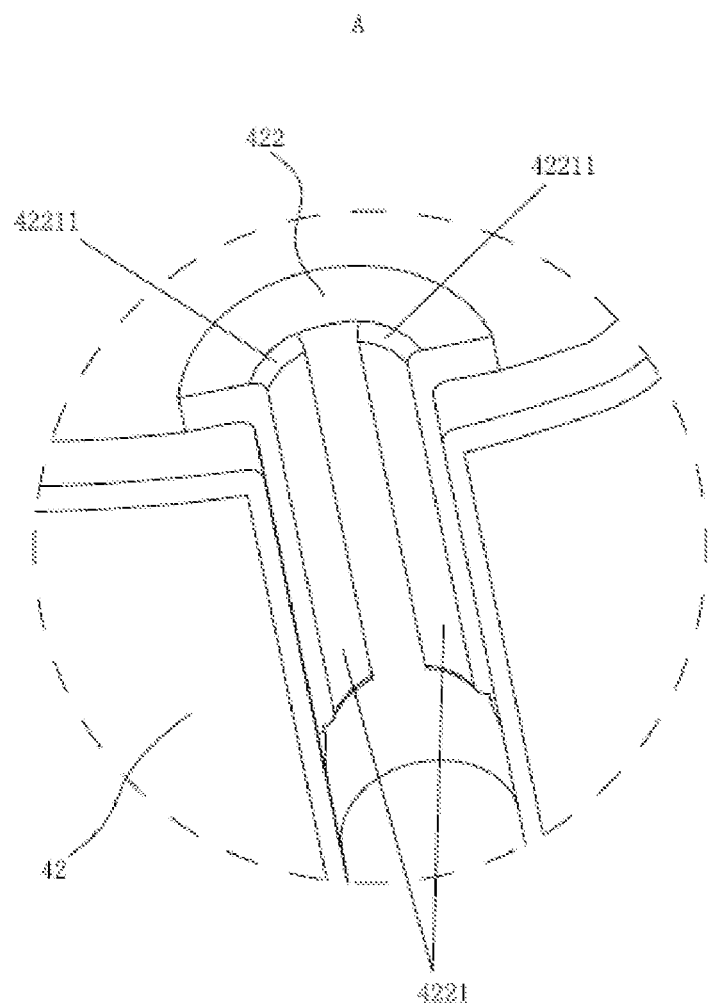
FIG. 7 is an enlarged view of section A in FIG. 6.
Figure 8:
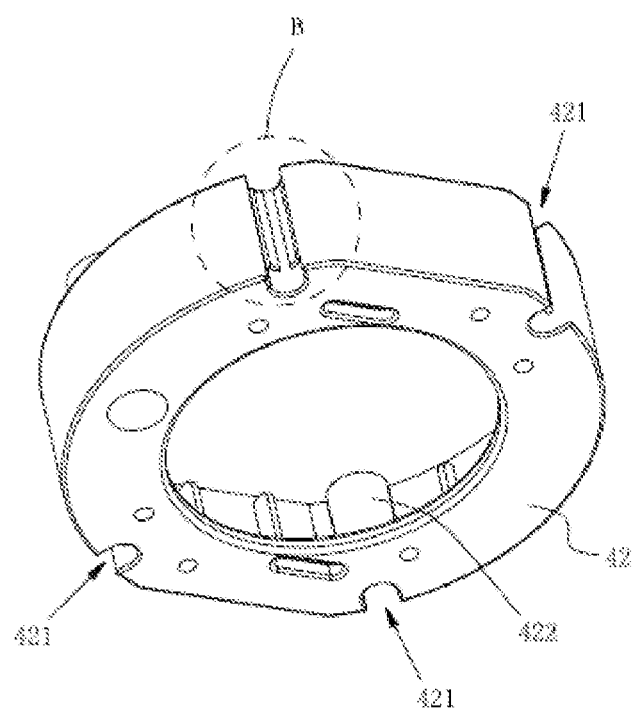
FIG. 8 is a schematic diagram showing a second perspective view of an adapter frame in a photography lamp according to an embodiment the present disclosure.
Figure 9:
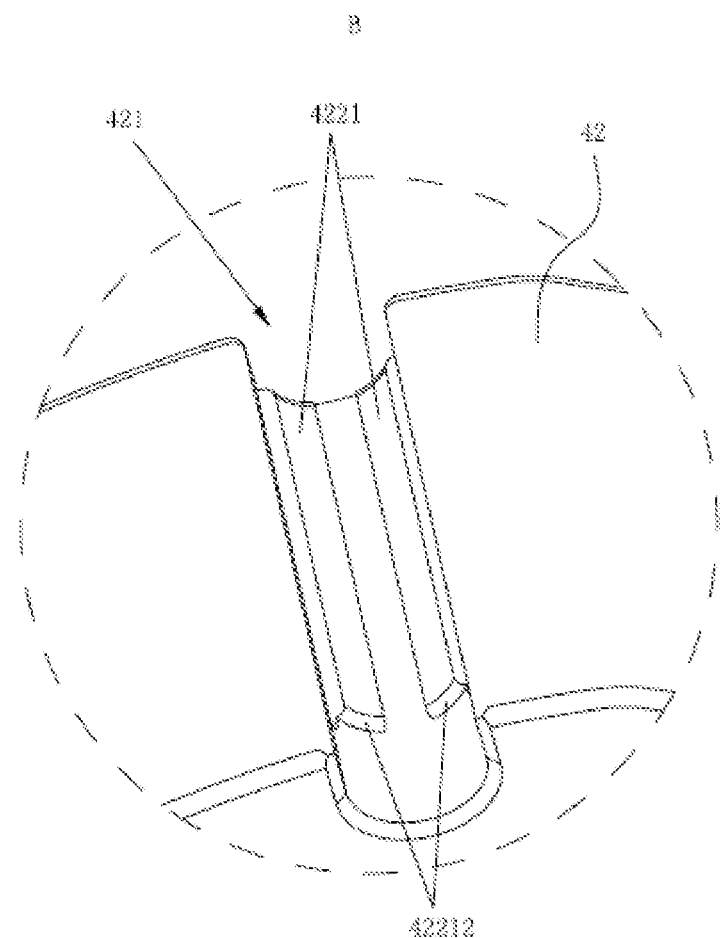
FIG. 9 is an enlarged view of section B in FIG. 8.

Specifically, as shown in FIG. 5, the direction parallel to the central axis of the lamp barrel 11 is the longitudinal direction, and the direction perpendicular to the central axis of the lamp barrel 11 is the transverse direction. The cross-section of each guide slide rail 101 is circular or other arc shapes that can match the first avoidance gap 421. As shown in FIG. 7 and FIG. 9, two first contacting ribs 4221 are disposed at intervals on the side of the first supporting bar 422 facing the guide slide rail 101, and the two first contacting ribs extend longitudinally. The top-surface of each first contacting rib 4221 is arc-shaped, and the arc-shaped top surface of the first contacting rib 4221 is in sliding contact with the guide slide rail 101. In design, the arc-shaped top surface of the first contacting rib 4221 and the corresponding side surface of the guide slide rail 101 are elastically contacted and supported, and with the theoretical design single set of 0.15 mm clearance fit relationship to movement smoothly within the controlled tolerance range.

More specifically, both ends of each first contacting rib 4221 are respectively provided with a first R angle 42211 and a second R angle 42212, so that when the guide slide rail 101 is inserted into the first avoidance gap 421, the first R angle 42211 has an guiding effect on the guide slide rail 101. During the sliding process of the guide slide rail 101 relative to the adapter frame 42, the first R angle 42211 and the second R angle 42212 have a slip guiding effect to the guide slide rail 101.

Figure 10:
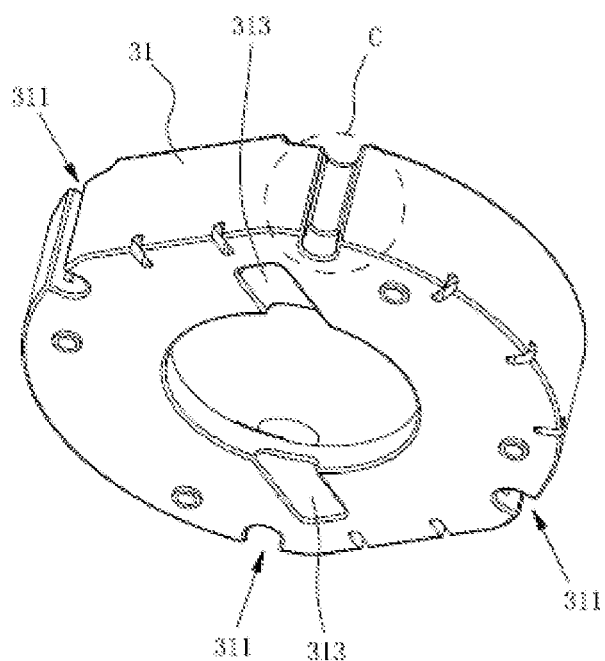
FIG. 10 is a schematic diagram showing a second perspective view of a mounting frame of a photography lamp according to an embodiment the present disclosure.
Figure 11:
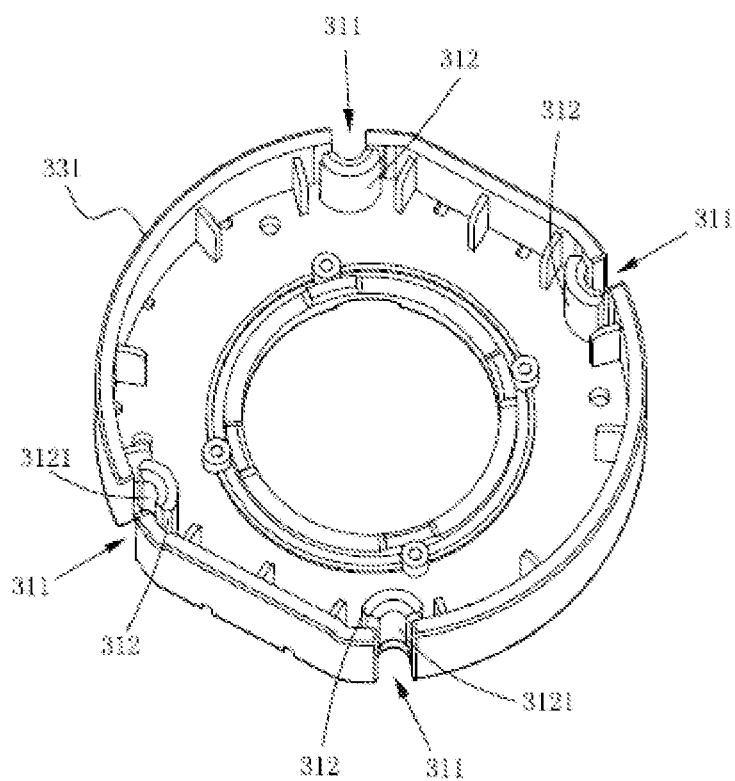
FIG. 11 is a schematic diagram showing a second perspective view of a mounting frame of a photography lamp according to an embodiment the present disclosure.
Figure 12:
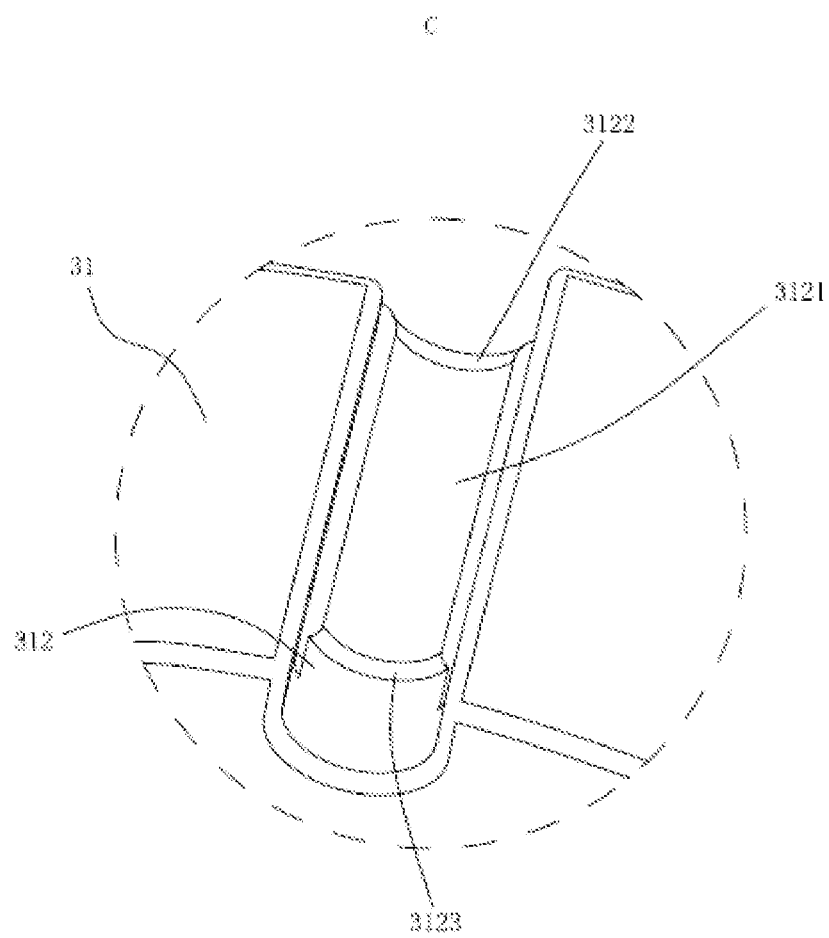
FIG. 12 is an enlarged view of section C in FIG. 10.

As shown in FIG. 10 to FIG. 12, corresponding to the design form of the adapter frame 42, a second avoidance gap 311 that adapted to the guide slide rails 101 is disposed on the mounting frame 31, and the mounting frame 31 is connected with a second supporting bar 312 corresponding to the second avoidance gaps 311. One end of the second supporting bar 312 is fixedly connected to the mounting frame 31, the other end of the second supporting bar 312 is free end, and the shaft of the second supporting bar 312 and the mounting frame 31 are spaced apart. Furthermore, the second supporting bar 312 is formed with a second contacting rib 3121, and the top-surface of the second contacting rib 3121 is also arc-shaped. The arc-shaped top surface of the second contacting rib 3121 is in sliding contact with the guide slide rail 101. As shown in FIG. 12, both ends of second contacting rib 3121 are respectively provided with a third R angle 3122 and a fourth R angle 3123, so that the fourth R angle 3123 has a guiding effect on the guide slide rail 101 during the assembly process. And during the sliding process of the guide slide rail 101 relative to the mounting frame 31, the third R angle 3122 and the fourth R angle 3123 have a slip guiding effect to the guide slide rail 101.

In addition, a heat pipe end receiving groove 313 is disposed on the mounting frame 31. The heat-conducting pressing sheet 34 is provided with a notch corresponding to the heat pipe end receiving groove 313. Thus, when the heat pipe 23 is assembled, the end of the heat pipe 23 enters the heat pipe end receiving groove 313 through the notch of the heat-conducting pressing sheet 34. When the assembly is completed, the end of the heat pipe 23 is accommodated in the heat pipe end receiving groove 313, and the part of heat-conducting pressing sheet 34 is pressed in contact with the end of the heat pipe 23.

While the present disclosure has been described with the embodiments, it is preferable that the above embodiments should not be construed as limiting of the present disclosure. On the contrary, the present disclosure includes all the modifications and variations without departing from the spirit and scope of the present disclosure.

What is claimed is:

1. A photography lamp comprising:
   a housing assembly including a lamp barrel with a light outlet end and an assembly rear end, and a rear cover disposed on the assembly rear end, wherein a main air inlet is disposed on the rear cover, an air outlet grille is disposed on a side wall of the lamp barrel close to the light outlet end;
   a heat dissipation assembly that movably disposed within the lamp barrel, the heat dissipation assembly includes a fan; and
   a light source assembly that movably disposed within the lamp barrel;
   wherein the fan and the light source assembly are connected and moved synchronously with each other, the fan is located between the rear cover and the light source assembly, an air outlet side of the fan faces the light source assembly, a spacing is arranged between the air outlet side of the fan and the light source assembly, and the spacing is always facing the air outlet grille in the direction of the central axis of the lamp barrel.

2. The photography lamp as claimed in claim 1, wherein an auxiliary air inlet grille is disposed on a side wall of the lamp barrel close to the assembly rear end, and the auxiliary air inlet grille is located between the rear cover and an air inlet side of the fan.

3. The photography lamp as claimed in claim 2, wherein the heat dissipation assembly comprises a radiator mounted between the fan and the light source assembly, wherein a plurality of fins are disposed with spacings therebetween to form the radiator, wherein spacings between the plurality of fins are always facing the air outlet grille in the direction of the central axis of the lamp barrel; and
   a heat pipe disposed between the radiator and the light source assembly, the heat pipe is in contact with the bottom of the radiator and the top of the light source assembly.

4. The photography lamp as claimed in claim 3, wherein the light source assembly comprises mounting frame;
   a light source lens mounted on the mounting frame;

LED chips mounted on the mounting frame, and the LED chips emits light out through the light source lens; and a heat-conducting pressing sheet connected to the mounting frame, wherein the LED chips is pressed on the mounting frame by the heat-conducting pressing sheet, as well as the heat pipe is in contact with the heat-conducting pressing sheet.

5. The photography lamp as claimed in claim 4, wherein the photography lamp further comprises:

a driving assembly, wherein the first end of the driving assembly is disposed on the rear cover, the second end of the driving assembly is connected with the heat dissipation assembly, the heat dissipation assembly and the light source assembly move in the lamp barrel with the drive of the driving assembly; and a light outlet lens mounted on the light outlet end.

6. The photography lamp as claimed in claim 5, wherein the light source assembly further comprises a light shield; wherein one end of the light shield is connected to the mounting frame, the other end of the light shield extends towards the light outlet side of the light source lens and the air outlet grille that corresponding to the space between the light outlet side of the light source lens and the light outlet lens is shield by the light shield when the light source assembly moves.

7. The photography lamp as claimed in claim 5, wherein the driving assembly comprises: a screw rod the first end of which is connected to the rear cover;

an adapter frame connected to the heat dissipation assembly; and an internal thread sleeve mounted and fixed on the adapter frame, while the second end of the screw rod is threadedly connected to the internal thread sleeve.

8. The photography lamp as claimed in claim 7, wherein the fan and the radiator are both fixedly connected to the adapter frame, and an interval for noise reduction is formed by the fan passing through the adapter frame and the radiator.

9. The photography lamp as claimed in claim 7, wherein at least one guide slide rail extending along the central axis of the lamp barrel is disposed on the inner wall of the lamp barrel;

wherein a first avoidance gap that adapted to the guide slide rail is disposed on the adapter frame, the adapter frame is connected with a first supporting bar corresponding to the first avoidance gap, one end of the first supporting bar is fixedly connected to the adapter frame, the other end of the first supporting bar is free end, and the shaft of the first supporting bar and the adapter frame are spaced apart;

wherein a second avoidance gap adapted to the guide slide rail is disposed on the mounting frame, and the mounting frame is connected with a second supporting bar corresponding to the second avoidance gap, one end of the second supporting bar is fixedly connected to the adapter frame, the other end of the second supporting bar is free end, and the shaft of the first supporting bar and the mounting frame are spaced apart.

10. The photography lamp as claimed in claim 9, wherein there are four guide slide rails evenly distributed along the circumference of the inner side wall of the lamp barrel, and the cross section of each guide slide rail is circular, wherein the first supporting bar is formed with two first contacting ribs at intervals, the second supporting bar is formed with a second contacting rib, and top surfaces of the first contacting ribs and the second contacting rib are all arc-shaped surfaces, and the arc-shaped top surfaces of the first contacting ribs and the second contacting rib are in sliding contact with the guide slide rail.

\* \* \* \* \*